Aug. 15, 1961  W. L. GLOMB  2,996,613
DETECTOR CIRCUIT
Filed March 6, 1956
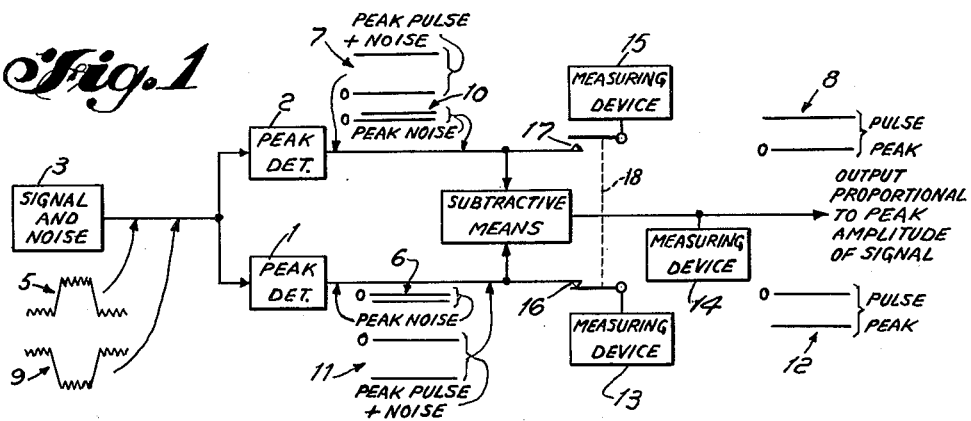
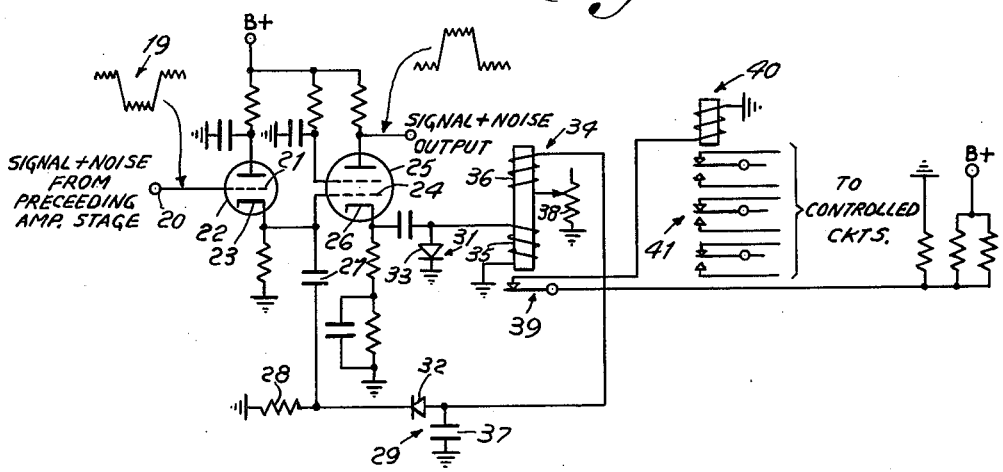
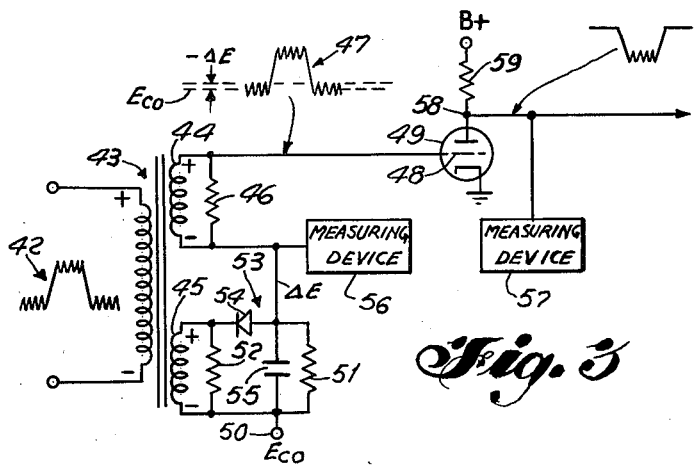
INVENTOR
WALTER L. GLOMB
BY Alfred C. Hill
AGENT

2,996,613
DETECTOR CIRCUIT
Walter L. Glomb, Clifton, N.J., assignor to International Telephone and Telegraph Corporation, Nutley, N.J., a corporation of Maryland
Filed Mar. 6, 1956, Ser. No. 569,779
12 Claims. (Cl. 250—20)

This invention relates to signal detector circuits and more particularly to a detector circuit for deriving output energy representative of the amplitude of signals even through said signals may be in the presence of noise.

The detection of the signal and noise components of received energy in a communication system, such as a pulse-type communication system, becomes necessary if diversity, squelch, switchover and/or alarm facilities are provided in the system. The information desired of such a detection system is essentially the amplitude of the received pulse signal independent of noise and the amplitude of the noise independent of the pulse signal. Proper utilization of the detected components facilitates the operation of diversity, squelch, switchover and/or alarm facilities. Furthermore, measurement of the energy representing the two components of received energy enables a determination of the signal-to-noise ratio of the communication system.

An object of this invention is the provision of a detector circuit to derive output energy representative of the amplitude of signals even though said signals may be in the presence of noise.

Examination of the characteristics of noise and of a received pulse indicates that the following differences can be exploited in designing a detection system, i.e., pulse and noise differ in frequency spectrum, time of occurrence, amplitude and waveform symmetry. Evaluation of these characteristics indicates that the difference in waveform symmetry is more nearly universally applicable and results in simpler detection circuitry than the other differences.

Therefore, another object of this invention is the provision of a detector circuit operating on the difference in waveform symmetry present between pulse signals and noise to provide energy representative of the amplitude of pulse signals only.

A feature of this invention is to provide a circuit means coupled to a source of signals in the presence of noise to pass energy corresponding to the combined signal and noise of said source, a detecting means coupled to said source for detecting only the peak voltage of said noise and means to apply the detected noise voltage to said circuit means to reduce the output energy of said circuit means by an amount corresponding to said detected noise voltage.

Another feature of this invention is to provide as the circuit means of the detector circuit a peak detector to provide a voltage equal to the peak amplitude of the signal plus noise and a polarized relay to effectively subtract the detected peak noise voltage from the detected signal plus noise voltage. The resultant voltage is effectively equal to the peak signal amplitude only and is utilized to energize the relay if the peak amplitude thereof is above a given value. A peak amplitude of signal voltage below said given value will de-energize the relay and thereby initiate switchover and/or alarm operation.

Still another feature of this invention is to provide as the circuit means of the detector circuit a triode biased below cutoff and whose conduction level is further adjusted by the amplitude of the detected peak noise voltage to pass through said triode, upon presence of the combined signal and noise, a pulse whose amplitude is equal substantially to the amplitude of the signal only.

The above-mentioned and other features and objects of this invention will become more apparent by reference to the following description taken in conjunction with hte accompanying drawings, in which:

FIG. 1 is a block diagram illustrating the principle of this invention;
FIG. 2 is a schematic diagram of one form of this invention; and
FIG. 3 is a schematic diagram of another form of this invention.

The principle of this invention makes use of the waveform symmetry difference between noise and a pulse signal. The fact that noise is essentially statistically symmetrical, i.e., over a long enough sampling period, the positive peaks have as large an amplitude as the negative peaks, implies that a peak detector of either polarity will allow the same absolute voltage output. For pulses, however, a positive peak detector will obviously allow much greater output on a positive pulse train than a negative peak detector. The converse is also true where a negative peak detector will obviously allow much greater output on a negative pulse train than will a positive peak detector.

Referring to FIG. 1, the signal detector of this invention is illustrated as comprising in its simplest form a peak detector 1 and a peak detector 2 coupled in parallel to source 3 whose output includes a signal with superimposed noise. The output of one detector is a voltage representative of the amplitude of the signal plus noise, and the output of the other detector is a voltage representative of the amplitude of the noise only. The resultant outputs of peak detectors 1 and 2 are coupled to a means 4, identified in FIG. 1 as a subtractive means, to derive from the output voltages of detectors 1 and 2 energy corresponding to the difference between these two output voltages, energy substantially equal to the signal energy only.

Consider the operation of the circuit of FIG. 1 when the output of source 3 is a positive signal as illustrated at 5. Detector 1 is a negative peak detector which produces at the output thereof a D.C. voltage approximately proportional to the noise component in signal 5 as illustrated at 6. Detector 2, a positive peak detector, and subtractive means 4 constitute a circuit means coupled to source 3 for operation on signal 5 to pass therealong energy corresponding to the amplitude of the combined signal and noise as illustrated at 7. The output of detector 1 is coupled to subtractive means 4, a portion of the circuit means, to reduce the combined signal and noise by an amount approximately equal to the noise amplitude, thereby producing energy substantially equal to the signal amplitude only as indicated at 8.

If the output of source 3 were negative as illustrated at 9 and without changing the polarity of the detectors discussed hereinabove, the positive peak detector 2 would produce a voltage output approximately proportional to the noise component in signal 9 as illustrated at 10. Negative peak detector 1 and subtractive means 4 would in this instance constitute the circuit means coupled to source 3 for operation on signal 9 to pass therealong energy corresponding to the amplitude of the combined signal and noise as illustrated at 11. The output of detector 2 is coupled to subtractive means 4, a portion of the circuit means, to reduce the combined signal and noise energy by an amount approximately equal to the noise amplitude, thereby providing energy substantially equal to the signal amplitude only as indicated at 12.

The resultant outputs of the detectors when operating on positive or negative pulses are approximate as indicated hereinabove inasmuch as the pulse signal has a small negative component which is a function of the duty cycle of the pulse train. This small negative increment is effectively added to the negative peak and subtracted from the positive peak of the components of the signals of source 3. In pulse systems involving duty cycles of 10 to 1 or greater, this increment is usually negligible.

It should be pointed out that in the case of a positive output signal of source 3 the quantity at the output of detector 1 is directly proportional to the peak noise and the output of the subtractive means is directly proportional to the peak signal. Therefore, by employing measuring devices 13 and 14 connected as illustrated, it is possible to determine the signal-to-noise ratio of the communication system. In the case of negative output signals from source 3, the output of peak detector 2 is directly proportional to the peak noise, and, therefore, a measuring device 15 disposed to measure the output of peak detector 2 and the measuring device 14 will enable the determination of the signal-to-noise ratio in the presence of negative signals. This signal-to-noise ratio determination can be enhanced by ganging switches 16 and 17 by means of a linking device 18 to facilitate the switching in and out of measuring devices 13 and 15 dependent upon the polarity of the output signal of source 3.

Referring to FIG. 2, a specific form of the detector circuit of this invention is illustrated therein and is employed as the monitoring portion of an alarm circuit which may be utilized in radio link communication systems.

A negative input signal 19 coupled from a preceding stage in the video amplifier of a radio link receiver is coupled to terminal 20 and, hence, to grid 21 of cathode follower 22. The negative voltage at cathode 23 is coupled to grid 24 of amplifier 25 which likewise provides a negative output at cathode 26. The output at cathode 23 of cathode follower 22 is coupled by means of condenser 27 and resistor 28 to the negative peak detector 29. The output at cathode 26 of amplifier 25 is coupled through condenser 30 to positive peak detector 31. The cathode follower 22 and the cathode follower output of amplifier 25 effectively constitute a single source of signal energy for coupling to the peak detectors 29 and 31. The peak detectors 29 and 31 include as a major component thereof a diode rectifier 32 and 33, respectively, the outputs of which are coupled to the polarized relay 34.

The positive peak detector 31 produces a voltage across winding 35 of relay 34 proportional to the peak noise. The negative peak detector 29 develops a voltage proportional to the amplitude of the signal plus noise across winding 36 of relay 34. Detector 29 and winding 36 of relay 34 constitute the circuit means of this invention acted on by the output of detector 31 through means of winding 35 to produce a quantity effectively corresponding to the peak signal voltage only. The windings of relay 34 cooperate to function as a subtractive means, and the difference of the voltage coupled to the separate coils actuates the sensitive relay 34. Since this difference is proportional to (signal plus noise) minus (noise), it is apparent that the relay 34 responds only to received signal amplitude regardless of noise amplitude.

The time constant for negative detector 29 is provided by condenser 37 and the resistance of coil 36 and potentiometer 38. The time constant for the positive peak detector 31 is provided by condenser 30 and the resistance of coil 35. The purpose of resistor 38 besides cooperating in the time constant circuit is to establish a threshold level for the de-energizing of relay 34 so that if the resultant voltage corresponding to signal only falls below a given value relay 34 will be de-energized. This starts a chain of events including the opening of contact 39 which, in turn, de-energizes relay 40. This changes the position of the contacts 41 from that shown to the opposite position to activate the alarm circuits to indicate that the signal amplitude has fallen below the minimum desirable signal level, representing a possible failure at some point within the communication system and further to activate switching in standby equipment. It should be obvious that as long as the resultant signal amplitude as detected by the circuit of this invention stays above the given relay threshold relay 34 will be energized and no failure indication or switching will occur.

FIG. 3 illustrates another circuit utilizing the principles of this invention as described in connection with FIGS. 1 and 2. Its purpose is to select a pulse clipping amplitude which represents a point just above noise. This is desirable in pulse time modulation systems where the optimum clipping amplitude is at the base line in the absence of noise and should be just above noise peaks with noise. This results in a pulse output representative of the signal amplitude only.

A signal input as illustrated at 42 is coupled to the primary of transformer 43 and, hence, to secondary windings 44 and 45 of transformer 43. A voltage representative of the current induced in winding 44 is developed across resistor 46, said voltage representing the combined signal and noise of the source as indicated at 47. This voltage is coupled to grid 48 of triode 49. The transformer winding 44 and triode device 49 represent the circuit means of this embodiment. A negative bias voltage is coupled at terminal 50 and, hence, through resistor 51 and resistor 46 to bias grid 48 such that triode 49 is at cutoff potential. The current induced in winding 45 is translated to a voltage by resistor 52 and operated on by peak detector 53 which includes the diode 54 and the time constant represented by condenser 55 and resistor 51. The peak detector develops a voltage proportional to the peak noise amplitude, identified as $\Delta E$, and is added to the cutoff bias $E_{co}$. This combined bias voltage on grid 48 permits only that part of the combined signal input at grid 48 exceeding the peak noise amplitude to be amplified.

By employing the circuit of FIG. 3, it is also possible to determine the signal-to-noise ratio by employing measuring device 56 and measuring device 57. Device 56 measures the peak noise level and the device 57 measures the amplitude of the resultant output at anode 58, a pulse signal corresponding to the amplitude of the signal only.

Typical values of a possible reduction to practice of the circuit of FIG. 3 are as follows:

| | |
|---|---|
| Resistor 46 | 1,000 ohms. |
| Resistor 52 | 1,200, ohms. |
| Resistor 51 | 560,000 ohms. |
| Anode resistor 59 | 2,200 ohms. |
| Rectifier 54 | Texas Instrument crystal rectifier 601. |
| Triode device 49 | Type 2C51. |
| Input impedance | 50 ohms. |
| $E_{co}$ | Cutoff voltage of device 49. |

The principles utilized in the above-described circuits represent a novel means of separately monitoring the pulse and noise amplitudes of a pulse receiver video output. The technique is universally applicable to any pulse signal subject to the restriction that the pulse duty cycle be considerably greater than one and that the point monitored represents a linear function of the receiver second detector output.

While I have described above the principles of my invention in connection with specific apparatus, it is to be clearly understood that this description is made only by way of example and not as a limitation to the scope of my invention as set forth in the objects thereof and in the accompanying claims.

I claim:

1. A detector circuit for deriving an output signal corresponding to the peak amplitude of unidirectional pulse signals even though said pulse signals may have noise superimposed thereon comprising a source of unidirectional pulse signals having a given polarity, an amplitude sensitive circuit means coupled to said source responsive to said given polarity pulse signals and the polarity of said superimposed noise equal to said given polarity to provide an output signal having an amplitude substantially equal to the peak amplitude of said pulse signals plus the peak amplitude of any noise superimposed on said pulse signals in said source, an amplitude detecting means coupled to said source responsive to the polarity of said superimposed noise opposite to said given polarity to detect the peak amplitude of said superimposed noise only, and means to couple said detecting means to said circuit means to reduce the amplitude of said output signal by an amount substantially equal to said detected noise amplitude.

2. A detector circuit according to claim 1, wherein said circuit means includes a normally non-conductive electron discharge device having the point of conduction thereof controlled by said detected noise amplitude to reduce at the output of said discharge device said output signal to an amplitude substantially equal to the peak amplitude of said pulse signals only.

3. A detector circuit according to claim 1, wherein said circuit means includes a second amplitude detecting means to provide said output signal and a subtraction means coupled to said second detecting means to subtract said detected noise amplitude from said output signal.

4. A detector circuit for deriving an output signal corresponding to the peak amplitude of unidirectional pulse signals even though said pulse signals may have noise superimposed thereon comprising a source of positive unidirectional pulse signals and noise superimposed on said pulse signals, an amplitude sensitive circuit means coupled to said source responsive to said positive pulse signals and the positive peak of said noise to provide an output signal having an amplitude substantially equal to the peak amplitude of said pulse signals plus the peak amplitude of said noise, a negative peak amplitude detector coupled to said source to detect the negative peak amplitude of said noise only, and means to couple said detector to said circuit means to reduce the amplitude of said output signal by an amount substantially equal to said detected noise amplitude.

5. A detector circuit according to claim 4, wherein said circuit means includes a normally non-conductive electron discharge device having the point of conduction thereof controlled by said detected noise amplitude to reduce at the output of said discharge device said output signal to an amplitude substantially equal to the peak amplitude of said pulse signals only.

6. A detector circuit according to claim 4, wherein said circuit means includes a positive peak amplitude detector to provide said output signal and a subtraction means coupled to said positive detector to subtract said detected noise amplitude from said output signal.

7. A detector circuit for deriving an output signal corresponding to the peak amplitude of unidirectional pulse signals even though said pulse signals may have noise superimposed thereon comprising a source of negative unidirectional pulse signals and noise superimposed on said pulse signals, an amplitude sensitive circuit means coupled to said source responsive to said negative pulse signals and the negative peak of said noise to provide an output signal having an amplitude substantially equal to the peak amplitude of said pulse signals plus the peak amplitude of said noise, a positive peak amplitude detector coupled to said source to detect the positive peak amplitude of said noise only, and means to couple said positive detector to said circuit means to reduce the amplitude of said output signal by an amount substantially equal to said detected noise amplitude.

8. A detector circuit according to claim 7, wherein said circuit means includes a negative peak amplitude detector to provide said output signal and a subtraction means coupled to said negative detector to subtract said detected noise amplitude from said output signal.

9. A detector circuit for deriving a resultant signal corresponding to the peak amplitude of unidirectional pulse signals even though said pulse signals may have noise superimposed thereon comprising a source of positive unidirectional pulse signals and noise superimposed on said pulse signals, a positive peak amplitude detector coupled to said source to provide an output signal having an amplitude substantially equal to the peak amplitude of said pulse signals plus the peak amplitude of said noise, a negative peak amplitude detector coupled to said source to detect the peak amplitude of said noise only, and subtraction means coupled to said positive detector and said negative detector to subtract said detected noise amplitude from said output signal to provide a resultant signal having an amplitude substantially equal to the peak amplitude of said pulse signal only.

10. A detector circuit for deriving a resultant signal corresponding to the peak amplitude of unidirectional pluse signals even though said pulse signals may have noise superimposed thereon comprising a source of negative unidirectional pulse signals and noise superimposed thereon, a negative peak amplitude detector coupled to said source to provide an output signal having an amplitude substantially equal to the peak amplitude of said pulse signals plus the peak amplitude of said noise, a positive peak amplitude detector coupled to said source to detect the peak amplitude of said noise only, and subtraction means coupled to said negative detector and said positive detector to subtract said detected noise amplitude from said output signal to provide a resultant signal having an amplitude substantially equal to the peak amplitude of said pulse signal only.

11. A detector circuit for deriving a resultant output signal corresponding to the peak amplitude of unidirectional pulse signals even though said pulse signals may have noise superimposed thereon comprising a source of unidirectional pulse signals having a given polarity and noise superimposed thereon, a first peak detector including a first diode coupled to said source responsive to said given polarity pulse signals and the polarity of said noise equal to said given polarity to provide an output signal having an amplitude substantially equal to the peak amplitude of said pulse signals plus the peak amplitude of said noise, a peak detector including a second diode coupled to said source to detect the peak amplitude of the polarity of said noise opposite to said given polarity only, and subtraction means coupled to said first and second diodes to subtract said detected noise amplitude from said output signal to provide a resultant signal having an amplitude substantially equal to the peak amplitude of said pulse signals.

12. A detector circuit for deriving a resultant output signal corresponding to the peak amplitude of unidirectional pulse signals even though said pulse signals may have noise superimposed thereon comprising a source of positive unidirectional pulse signals and poise superimposed on said pulse signals, a peak detector including a diode coupled to said source to detect the negative peak amplitude of said noise only, an electron discharge device having at least an anode, a cathode and a control grid, conductive means to couple the signal of said source to the control grid of said device, a bias voltage source coupled in additive relation with said detector and resistive means coupling a signal having an amplitude equal to the sum of the amplitude of the voltage of said bias source plus said detected noise amplitude to the control grid of said device to establish the conduction level thereof at a value just above said detected noise amplitude to produce at the anode of said device a resultant signal substantially equal to the peak amplitude of said pulse signal only.

References Cited in the file of this patent

UNITED STATES PATENTS

| | | |
|---|---|---|
| 1,704,736 | Geiger | Mar. 12, 1929 |
| 1,940,153 | Steel | Dec. 19, 1933 |
| 2,227,415 | Wolff | Dec. 31, 1940 |
| 2,450,818 | Vermillion | Oct. 5, 1948 |
| 2,540,512 | Crosby | Feb. 6, 1951 |
| 2,826,635 | Holmes | Mar. 11, 1958 |

FOREIGN PATENTS

| | | |
|---|---|---|
| 842,714 | France | Mar. 13, 1939 |